United States Patent
Sugimoto et al.

(10) Patent No.: US 6,933,338 B2
(45) Date of Patent: Aug. 23, 2005

(54) WATER- AND OIL-REPELLENT COMPOSITION

(75) Inventors: Shuichiro Sugimoto, Yokohama (JP); Takashige Maekawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/692,691

(22) Filed: Oct. 27, 2003

(65) Prior Publication Data

US 2004/0087695 A1 May 6, 2004

Related U.S. Application Data

(63) Continuation of application No. PCT/JP02/03956, filed on Apr. 19, 2002.

(30) Foreign Application Priority Data

Apr. 25, 2001 (JP) ........................................ 2001-127977

(51) Int. Cl.$^7$ ................................................ C08K 5/06
(52) U.S. Cl. ........................... 524/377; 106/2; 252/8.62; 427/393.4; 524/386; 524/457; 524/507; 524/544; 524/589; 524/591; 526/245
(58) Field of Search ............................ 106/2; 252/8.62; 427/393.4; 524/377, 386, 457, 507, 544, 589, 591; 526/245

(56) References Cited

U.S. PATENT DOCUMENTS 5,578,688 A * 11/1996 Ito et al. ..................... 526/245
6,177,531 B1   1/2001 Shimada et al.
6,376,592 B1   4/2002 Shimada et al.
6,624,268 B1   9/2003 Maekawa et al.

FOREIGN PATENT DOCUMENTS

| EP | 0 247 489 A2 | 12/1987 |
|----|--------------|---------|
| EP | 0 898 011 | 2/1999 |
| JP | 63 75082 | 4/1988 |
| JP | 1 153784 | 6/1989 |
| JP | 11-92752 | 4/1999 |
| JP | 2000-160147 | 6/2000 |
| JP | 2000-256302 | 9/2000 |
| JP | 2001-107031 | 4/2001 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

To provide a water- and oil-repellent composition excellent in durability and excellent in safety and preservation of the environment. A water- and oil-repellent composition which comprises (A) a polymer, (B) an aqueous medium and (C) a surfactant in a mass ratio of (A)/(B)/(C)=100/100–500/1–10, the polymer (A) containing a polymerization unit based on a (meth)acrylate having a polyfluoroalkyl group, a polymerization unit based on an alkyl(meth)acrylate having a $C_1$–$C_{12}$ alkyl group, a polymerization unit based on an alkyl(meth)acrylate having a $C_{16}$–$C_{22}$ alkyl group and a polymerization unit based on a specific compound having a blocked isocyanate group.

10 Claims, No Drawings

WATER- AND OIL-REPELLENT COMPOSITION

TECHNICAL FIELD

The present invention relates to a water- and oil-repellent composition excellent in safety and preservation of the environment, which can impart an excellent and durable water- and oil-repellency to a material to be treated.

BACKGROUND ART

Generally, techniques of treating textile goods, paper goods or the like with a water- and oil-repellent composition to impart a water- and oil-repellency or a water- and oil-resistance to their surfaces, are widely used in the field of industrial materials including daily clothing, sports clothing, umbrellas, tents, interior goods, wrapping papers or the like.

As a water- and oil-repellent composition, there is known an aqueous dispersion having a polymer containing a polymerization unit based on a monomer having a polyfluoroalkyl group (hereinafter referred to as "$R^f$ group") dispersed in water or a mixed solvent of water and an organic solvent (hereinafter referred to as "aqueous medium").

As a method for preparing such an aqueous dispersion, there is known a method of emulsion-polymerizing a monomer having an $R^f$ group or a method of emulsion-dispersing a polymer containing an $R^f$ group in an aqueous medium with an emulsifier. The aqueous dispersion thus obtained is blended with various additives, if desired.

Heretofore, various water- and oil-repellent compositions have been studied and worked to improve water- and oil-repellency, to improve durability to washing or abrasion, and to improve water pressure resistance or oil resistance. Also, various studies have been made to improve applicability to synthetic fibers such as polyester, nylon, acryl or the like, and natural fibers such as cotton, wool, silk or the like, and various proposals have been made with regard to monomers, surfactants, organic solvents, and the like.

Recently, in view of preservation of the environment, safety and health, a water- and oil-repellent composition has been changed from one using an organic solvent to one using an aqueous medium. Also, it is demanded to develop a water- and oil-repellent composition not containing a polymer containing a polymerization unit having a halogen atom (except for a fluorine atom).

Further, from economical viewpoints, it is demanded to develop a water- and oil-repellent composition capable of imparting water- and oil-repellency or water- and oil-resistance in a small amount, a water- and oil-repellent composition capable of achieving a water- and oil-repellent effect at a low heat treatment temperature, and a water- and oil-repellent composition capable of providing a high production yield, which is less influenced by processing conditions. Also, it is demanded to provide water- and oil-repellent compositions which satisfy various customers' needs. For example, it is demanded to develop a water- and oil-repellent composition excellent in water- and oil-repellent durability at the time of washing with water and drying by a tumbler dryer as a dry cleaning system using water and a domestic tumbler dryer have been spread. In order to improve such a durability, there is widely used a treating method of using a binder such as methylol melamine resin or blocked isocyanate resin and its catalyst in combination with a water- and oil-repellent composition obtained by copolymerizing a (meth)acrylate having an $R^f$ group with vinyl chloride, vinylidene chloride or the like. However, they are not satisfactory in view of influence of the above-mentioned organic chlorine compound to the environment, complexity of treating method, hard feeling of processed cloth, economical viewpoint or the like.

Also, methylol melamine resin is not preferable in view of environmental safety since it generates formalin, and use of blocked isocyanate resin is limited since it makes a treated material yellowish. Further, when using these binders, stability of a diluted solution at the time of processing is lowered and troubles such as settling of resin or contamination of a treated material by generation of a gel-like material are caused.

An object of the present invention is to provide a water- and oil-repellent composition excellent in safety and preservation of the environment and excellent in washing durability.

DISCLOSURE OF THE INVENTION

The present invention provides a water- and oil-repellent composition which comprises (A) the following polymer, (B) an aqueous medium and (C) a surfactant in a mass ratio of (A)/(B)/(C)=100/100–500/1–10:

Polymer (A): a copolymer containing (1) a polymerization unit based on a (meth)acrylate having a polyfluoroalkyl group, (2) a polymerization unit based on an alkyl(meth)acrylate having a $C_1$–$C_{12}$ alkyl group, (3) a polymerization unit based on an alkyl(meth)acrylate having a $C_{16}$–$C_{22}$ alkyl group, and (4) a polymerization unit based on at least one compound selected from the group consisting of 2-isocyanate ethyl methacrylate, 1,3,3-trimethyl-4-isocyanate cyclohexylmethylamidoxyethyl methacrylate of the following formula 1 and 1,3,3-trimethyl-4-isocyanate cyclohexylmethylamidoxyethyl acrylate of the following formula 2, the isocyanate group of which is blocked:

Formula 1

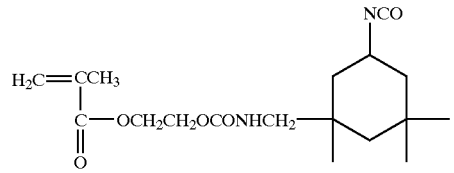

Formula 2

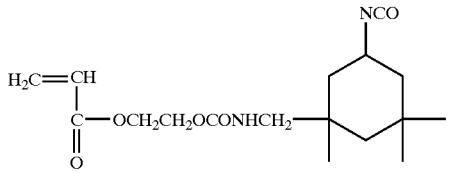

BEST MODE FOR CARRYING OUT THE INVENTION

In the present specification, "acrylate" and "methacrylate" are generally referred to as "(meth)acrylate". This expression is the same as in the case of "(meth)acrylamide" and the like.

The polymer (A) in the present invention is a polymer containing a polymerization unit based on (1) a (meth)acrylate ($a^1$) having an $R^f$ group.

The (meth)acrylate having an $R^f$ group (hereinafter referred to as "monomer $a^1$") is an ester of a (meth)acrylic acid with an alcohol having an $R^f$ group. The monomer $a^1$ is preferably a compound expressed by the following formula $A^{11}$. In the formula $A^{11}$, $R^f$ is an $R^f$ group, Q is a divalent organic group, and R is a hydrogen atom or a methyl group.

$$R^f—Q—OCOCR=CH_2 \qquad \text{Formula } A^{11}$$

$R^f$ in the formula $A^{11}$ is preferably an alkyl group in which at least 2 hydrogen atoms are substituted with fluorine atoms. The carbon number of $R^f$ is preferably from 2 to 20, particularly from 6 to 16. $R^f$ may have a linear structure or a branched structure, but a linear structure is more preferable. In the case of a branched structure, it is preferable to have the branched part present at the terminal portion of $R^f$ and to be a short chain having a carbon number of about 1 to 4. In the $R^f$, an etheric oxygen atom or a thioetheric sulfur atom may be contained. Examples of the terminal part structure of $R^f$ include $—CF_2CF_3$, $—CF(CF_3)_2$, $—CF_2H$ and $—CFH_2$, and a preferable example is $—CF_2CF_3$.

The number of a fluorine atom in $R^f$ is expressed by [(fluorine atom number in $R^f$)/(hydrogen atom number contained in alkyl group having the same carbon number as $R^f$)]×100(%), and the number of a fluorine atom in $R^f$ is preferably at least 60%, more preferably at least 80%, most preferably 100%. When the number of a fluorine atom in $R^f$ is 100%, $R^f$ is a perfluoroalkyl group.

The carbon number of a perfluoroalkyl group is preferably from 2 to 20, particularly from 6 to 16. When the carbon number of a perfluoroalkyl group is smaller, there is a tendency that water-repellent performance and oil-repellent performance are lowered, and when the carbon number of a perfluoroalkyl group is larger, there is a tendency that handling of its monomer $a^1$ becomes difficult.

Examples of $R^f$ include $C_4F_9—$ [such as a group of any isomer structure of $F(CF_2)_4—$, $(CF_3)_2CFCF_2—$, $(CF_3)_3C—$, or $CF_3CF_2(CF_3)CF—$], $C_5F_{11}—$ [such as $F(CF_2)_5—$], $C_6F_{13}—$ [such as $F(CF_2)_6—$], $C_7F_{15}—$ [such as $F(CF_2)_7—$ or $(CF_3)_2CF(CF_2)_4—$], $C_8F_{17}—$ [such as $F(CF_2)_8—$], $C_9F_{19}—$ [such as $F(CF_2)_9—$ or $(CF_3)_2CF(CF_2)_6—$], $C_{10}F_{21}—$ [such as $F(CF_2)_{10}—$], $C_{12}F_{25}—$ [such as $F(CF_2)_{12}—$], $C_{13}F_{27}—$ [such as $(CF_3)_2CF(CF_2)_8—$], $C_{14}F_{29}—$ [such as $F(CF_2)_{14}—$], $C_{16}F_{33}—$ [such as $F(CF_2)_{16}—$] and the like.

When $R^f$ as an etheric oxygen atom or a thioetheric sulfur atom, their examples include $F(CF_2)_5OCF(CF_3)—$, $F[CF(CF_3)CF_2O]_{1\sim5}CF(CF_3)CF_2CF_2—$, $F[CF(CF_3)CF_2O]CF(CF_3)—$, $F(CF_2CF_2CF_2O)_{1\sim5}CF_2CF_2—$, $F(CF_2CF_2O)_{1\sim5}CF_2CF_2—$, $F(CF_2)_5SCF(CF_3)—$, $F[CF(CF_3)CF_2S]_{1\sim5}CF(CF_3)CF_2CF_2—$, $CF_3CF_2CF_2SCF(CF_3)—$, $F[CF(CF_3)CF_2S]_{1\sim5}CF_2CF_2—$, $F(CF_2CF_2CF_2S)_{1\sim5}CF_2CF_2—$, $F(CF_2CF_2S)_{1\sim5}CF_2CF_2—$ and the like.

Particularly, $R^f$ is preferably a linear chain-like perfluoroalkyl group.

Q in the formula $a^{11}$ is preferably $—(CH_2)_{p+q}—$, $—(CH_2)_pCONR^a(CH_2)_q—$, $—(CH_2)_pOCONR^a(CH_2)_q—$, $—(CH_2)_pSO_2NR^a(CH_2)_q—$, $—(CH_2)_pNHCONH(CH_2)_q—$, $—(CH_2)_pCH(OH)(CH_2)_q—$, $—(CH_2)_pCH(OCOR^a)(CH_2)_q—$ and the like.

In the above formulae, $R^a$ is a hydrogen atom or an alkyl group, and p and q is independently an integer of at least 0 and p+q is an integer of from 1 to 22.

Preferable examples include $—(CH_2)_{p+q}—$, $—(CH_2)_pCONR^a(CH_2)_q—$ or $(CH_2)_pSO_2NR^a(CH_2)_q—$, wherein q is at least 2 and p+q is from 2 to 6. More preferable examples include an ethylene group, a propylene group, a butylene group, a pentamethylene group or a hexamethylene group.

Examples of the monomer a1 include the following compounds, wherein R is a hydrogen atom or a methyl group.

$F(CF_2)_5CH_2OCOCR=CH_2$,
$F(CF_2)_6CH_2CH_2OCOCR=CH_2$,
$H(CF_2)_6CH_2OCOCR=CH_2$,
$H(CF_2)_8CH_2OCOCR=CH_2$,
$H(CF_2)_{10}CH_2OCOCR=CH_2$,
$H(CF_2)_8CH_2CH_2OCOCR=CH_2$,
$F(CF_2)_8CH_2CH_2CH_2OCOCR=CH_2$,
$F(CF_2)_8CH_2CH_2OCOCR=CH_2$,
$F(CF_2)_{10}CH_2CH_2OCOCR=CH_2$,
$F(CF_2)_{12}CH_2CH_2OCOCR=CH_2$,
$F(CF_2)_{14}CH_2CH_2OCOCR=CH_2$,
$F(CF_2)_{16}CH_2CH_2OCOCR=CH_2$,
$(CF_3)_2CF(CF_2)_4CH_2CH_2OCOCR=CH_2$,
$(CF_3)_2CF(CF_2)_6CH_2CH_2OCOCR=CH_2$,
$(CF_3)_2CF(CF_2)_8CH_2CH_2OCOCR=CH_2$,
$F(CF_2)_8SO_2N(C_3H_7)CH_2CH_2OCOCR=CH_2$,
$F(CF_2)_8(CH_2)_4OCOCR=CH_2$,
$F(CF_2)_8SO_2N(CH_3)CH_2CH_2OCOCR=CH_2$,
$F(CF_2)_8SO_2N(C_2H_5)CH_2CH_2OCOCR=CH_2$,
$F(CF_2)_8CONHCH_2CH_2OCOCR=CH_2$,
$(CF_3)_2CF(CF_2)_5(CH_2)_3OCOCR=CH_2$,
$(CF_3)_2CF(CF_2)_5CH_2CH(OCOCH_3)OCOCR=CH_2$,
$(CF_3)_2CF(CF_2)_5CH_2CH(OH)CH_2OCOCR=CH_2$,
$(CF_3)_2CF(CF_2)_7CH_2CH(OH)CH_2OCOCR=CH_2$,
$F(CF_2)_9CH_2CH_2OCOCR=CH_2$,
$F(CF_2)_9CONHCH_2CH_2OCOCR=CH_2$.

The polymer (A) of the present invention may contain one or two or more polymerization units based on monomer $a^1$. When the polymer (A) contains at least two polymerization units, it is preferable that the polymerization units are based on monomer $a^1$ having $R^f$ respectively having different carbon numbers.

In addition to (1) monomer $a^1$, the polymer (A) of the present invention contains (2) a polymerization unit based on an alkyl(meth)acrylate (hereinafter referred to as "monomer $a^2$") having a $C_1$–$C_{12}$ alkyl group, (3) a polymerization unit based on an alkyl(meth)acrylate (hereinafter referred to as "monomer $a^3$") having a $C_{16}$–$C_{22}$ alkyl group, and (4) a polymerization unit based on at least one compound selected from the group consisting of 2-isocyanate ethyl methacrylate and 1,3,3-trimethyl-4-isocyanate cyclohexylmethylamidoxyethyl(meth)acrylate, the isocyanate group of which is blocked (hereinafter referred to as "monomer $a^4$").

The monomer $a^2$ is preferably a monomer having one unsaturated bond. The monomer $a^2$ may be one kind or a combination of two or more kinds.

Examples of the monomer $a^2$ include ethyl(meth)acrylate, propyl(meth)acrylate, butyl(meth)acrylate, isobutyl(meth)acrylate, tert-butyl(meth)acrylate, cyclohexyl(meth)acrylate, 2-ethylhexyl(meth)acrylate, octyl(meth)acrylate, dodecyl(meth)acrylate, ethylene glycol bis(meth)acrylate, diethylene glycol bis(meth)acrylate, neopentyl glycol bis(meth)acrylate, and the like.

The monomer $a^3$ is preferably a monomer having one unsaturated bond. The monomer $a^3$ may be one kind or a combination of two or more kinds. Examples of the monomer $a^3$ include cetyl(meth)acrylate, stearyl(meth)acrylate, behenyl(meth)acrylate, and the like.

The monomer $a^4$ is a monomer having a structure wherein an isocyanate group is blocked. Examples of the compound used for blocking the isocyanate group include 2-butanone oxime, cyclohexanone oxime, ε-caprolactam, ethyl acetoacetate, acetylacetone, phenol, methanol, dimethyl malonate, bisulfite, pyrazole, 3-methylpyrazole, 3,5-dimethylpyrazole, indazole, and the like.

In view of stability and reactivity, preferable examples include 2-butanone oxime, ethyl acetoacetate, diethyl malonate, pyrazole, 3-methylpyrazole or 3,5-dimethylpyrazole, and most preferable examples include 2-butanone oxime, 3-methylpyrazole or 3,5-dimethylpyrazole.

In the present invention, the polymer (A) may further contain a polymerization unit based on other monomer (hereinafter referred to as "monomer $a^5$") in addition to monomer $a^1$, monomer $a^2$, monomer $a^3$ and monomer $a^4$. Examples of the monomer $a^5$ include an olefin such as ethylene, propylene, isobutylene or butadiene, a fluoroolefin such as vinyl fluoride or vinylidene fluoride, an organic acid vinyl ester such as vinyl acetate or the like, styrene, α-methylstyrene, (meth)acrylamide, substituted (meth)acrylamide, alkyl vinyl ether, glycidyl(meth)acrylate, aziridinyl(meth)acrylate, hydroxyalkyl(meth)acrylate, polyoxyalkylene glycol mono(meth)acrylate, polyoxyalkylene glycol mono(meth)acrylate monomethyl ether, polyoxyalkylene glycol bis(meth)acrylate, (meth)acrylate having a polydimethylsiloxane group, triallylcyanurate, maleic acid ester, N-substituted aminoalkyl(meth)acrylate, and the like.

Preferable examples include glycidyl(meth)acrylate, hydroxyethyl(meth)acrylate, hydroxypropyl(meth)acrylate, hydroxybutyl(meth)acrylate, polyoxyalkylene glycol mono(meth)acrylate, polyoxyalkylene glycol mono(meth)acrylate monomethyl ether, or polyoxyalkylene glycol bis(meth)acrylate.

A content ratio of each polymerization unit in the polymer (A) is preferably polymerization unit based on monomer $a^1$/polymerization unit based on monomer $a^2$/polymerization unit based on monomer $a^3$/polymerization unit based on monomer $a^4$=40–80/15–40/3–15/2–10 in a mass ratio. A more preferable content ratio is polymerization unit based on monomer $a^1$/polymerization unit based on monomer $a^2$/polymerization unit based on monomer $a^3$/polymerization unit based on monomer $a^4$=50–70/20–38/4–10/3–8 in a mass ratio.

When the polymer (A) contains a polymerization unit based on monomer $a^5$, a content ratio of each polymerization unit is preferably polymerization unit based on monomer $a^1$/polymerization unit based on monomer $a^2$/polymerization unit based on monomer $a^3$/polymerization unit based on monomer $a^4$/polymerization unit based on monomer $a^5$=40–80/15–35/5–15/2–10/0.5–10 in a mass ratio. A more preferable content ratio is polymerization unit based on monomer $a^1$/polymerization unit based on monomer $a^2$/polymerization unit based on monomer $a^3$/polymerization unit based on monomer $a^4$/polymerization unit based on monomer $a^5$=50–70/20–38/4–10/3–6/1–5 in a mass ratio.

The aqueous medium (B) in the present invention is preferably water or a mixed solvent of water and a water-soluble solvent. Examples of the water-soluble solvent include at least one solvent selected from the group consisting of propylene glycol, dipropylene glycol, tripropylene glycol, propylene glycol monomethyl ether, propylene glycol monoethyl ether, dipropylene glycol monomethyl ether, dipropylene glycol monoethyl ether, and tripropylene glycol monomethyl ether. In view of water- and oil-repellency, preservation stability and safety, the aqueous medium (B) is more preferably water or a mixed solvent of water with at least one solvent selected from the group consisting of propylene glycol, dipropylene glycol and tripropylene glycol. In the water- and oil-repellent composition of the present invention, a content of the aqueous medium (B) is preferably polymer (A)/aqueous medium (B)=100/100–500 in a mass ratio. Also, when a water-soluble solvent is contained, a content of the water-soluble content is preferably polymer (A)/water-soluble solvent=100/0.1–50, more preferably 100/10–45, in a mass ratio. When the content of the water-soluble solvent is too small, freezing stability of emulsion is not satisfactory, and when the content of the water-soluble solvent is too large, it is not preferable in view of stability and preservation of the environment.

A surfactant (C) in the present invention is preferably a nonionic surfactant. Also, it is preferable to employ a combination of a nonionic surfactant with a cationic surfactant or an amphoteric surfactant. It is more preferable to employ a combination of a nonionic surfactant with a cationic surfactant.

The nonionic surfactant is preferably at least one nonionic surfactant selected from the group consisting of the following surfactants $c^1$ to $c^6$.

Surfactant $c^1$: polyoxyalkylene monoalkyl ether, polyoxyalkylene monoalkenyl ether or polyoxyalkylene monoalkapolyenyl ether, surfactant $c^2$: a nonionic surfactant comprising a compound having at least one carbon-carbon triple bond and at least one hydroxyl group in a molecule, surfactant $c^3$: a nonionic surfactant comprising a compound having a connection of a polyoxyethylene (hereinafter referred to as POE) chain having at least two oxyethylene chains continuously connected and a chain having at least two oxyalkylene chains of at least 3 carbon atoms continuously connected, and having hydroxyl groups on both terminals, surfactant $c^4$: a nonionic surfactant having an amine oxide group in a molecule, surfactant $c^5$: a nonionic surfactant comprising a condensate of polyoxyethylene mono(substituted phenyl)ether or polyoxyethylene mono(substituted phenyl) ether, and surfactant $c^6$: a nonionic surfactant comprising an aliphatic acid ester of polyol.

An alkyl group, an alkenyl group or an alkapolyenyl group (hereinafter, all of them are referred to as "$R^c$ group") in the surfactant $c^1$ has preferably a carbon number of from 4 to 26. The $R^c$ group is preferably linear chain-like or branched chain-like. As the branched structure, a secondary alkyl group, a secondary alkenyl group or a secondary alkapolyenyl group is preferable.

Examples of the $R^c$ group include an octyl group, a dodecyl group, a tetradecyl group, a hexadecyl group, an octadecyl group, a hexadecyl group, a behenyl group (dococyl group), and an oleyl group (9-octadecenyl group). Polyoxyalkylene monoalkyl ether or polyoxyalkylene monoalkenyl ether is more preferable. The $R^c$ group may be one kind or a combination of two or more kinds.

A polyoxyalkylene (hereinafter referred to as "POA") chain of the surfactant $c^1$ is preferably a chain having at least two of POE chain and/or polyoxypropylene (hereinafter referred to as "POP") chain connected. The POA chain may be one kind or a combination of at least two kinds of POA chains. When the POA chain comprises two kinds, they are preferably block-like connected chains.

The surfactant $c^1$ is preferably a compound expressed by the following $C^{11}$.

$$R^{10}O[CH_2CH(CH_3)O]_g\text{—}(CH_2CH_2O)_sH \qquad \text{Formula } C^{11}$$

In the above formula, $R^{10}$ is an alkyl group having a carbon number of at least 8 or an alkenyl group having a carbon number of at least 8, s is an integer of from 5 to 50, and g is 0 or an integer of from 1 to 20. When g and s are at least 2, a POE chain and a POP chain in the formula $C^{11}$ are block-like connected. It is preferable that $C^{10}$ is a straight chain structure or a branched chain structure, s is an integer of from 10 to 30 and g is 0 or an integer of from 1 to 10.

When s is at most 4 or g is at least 21, it becomes hardly soluble in water and is not uniformly dissolved in an aqueous medium, and therefore permeability of the water- and oil-repellent composition into a material to be treated is lowered. When s is at least 51, water-repellency of the treated material is lowered.

Examples of the compound expressed by the formula $C^{11}$ include the following compounds, wherein a POE chain and a POP chain are block-like connected.

$C_{18}H_{37}O[CH_2CH(CH_3)O]_2$—$(CH_2CH_2O)_{30}H$,
$C_{18}H_{35}O$—$(CH_2CH_2O)_{30}H$,
$C_{16}H_{33}O[CH_2CH(CH_3)O]_5$—$(CH_2CH_2O)_{20}H$,
$C_{12}H_{25}O[CH_2CH(CH_3)O]_2$—$(CH_2CH_2O)_{15}H$,
$(C_8H_{17})(C_6H_{13})CHO$—$(CH_2CH_2O)_{15}H$,
$C_{10}H_{21}O[CH_2CH(CH_3)O]_2$—$(CH_2CH_2O)_{15}H$.

The surfactant $c^2$ is preferably a nonionic surfactant comprising a carbon having one carbon-carbon triple bond and one or two hydroxyl groups in a molecule. The surfactant $c^2$ may have a POA chain in a molecule. Examples of the POA chain include a POE chain, a POP chain, a chain having a POE chain and a POP chain randomly connected, or a chain having a POE chain and a POP chain block-like connected.

Preferable examples of the surfactant $c^2$ include compounds expressed by the following formula $C^{21}$, $C^{22}$, $C^{23}$ or $C^{24}$.

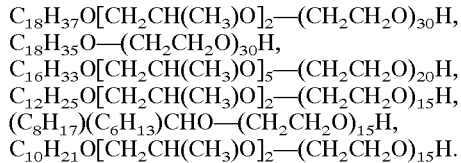

HO—$CR^{11}R^{12}$—C≡C—$CR^{13}R^{14}$—OH      Formula $C^{21}$

HO—$(A^1O)_m$—$CR^{11}R^{12}$—C≡C—
    $CR^{13}R^{14}$—$(OA^2)_n$—OH      Formula $C^{22}$ HO—$CR^{15}R^{16}$—C≡C—H      Formula $C^{23}$ HO—$(A^3O)k$-$CR^{15}R^{16}$—C≡C—H      Formula $C^{24}$ In the above formulae, $A^1$, $A^2$ and $A^3$ are respectively independently an alkylene group, m and n are respectively an integer of 0 or higher, (m+n) is an integer of at least 1, and k is an integer of at least 1. When m, n or k is respectively at least 2, $A^1$, $A^2$ and $A^3$ may be respectively one kind or a combination of two or more kinds.

$R^{11}$ to $R^{16}$ are respectively independently a hydrogen atom or an alkyl group. The alkyl group is preferably an alkyl group having a carbon number of from 1 to 12, more preferably an alkyl group having a carbon number of from 1 to 4. Examples of the alkyl group include a methyl group, an ethyl group, a propyl group, a butyl group, and an isobutyl group.

The POA chain is preferably a POE chain, a POP chain or a chain containing a POE chain and a POP chain. A repeating unit number of the POA chain is preferably from 1 to 50.

The surfactant $c^2$ is preferably a nonionic surfactant expressed by the following formula $C^{25}$, wherein x and y are respectively 0 or an integer of from 1 to 30. A nonionic surfactant expressed by the formula $C^{25}$ may be one kind or a combination of two or more kinds.

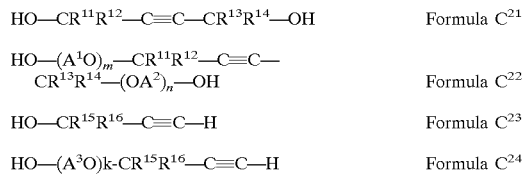

Formula C25

The nonionic surfactant of the formula $C^{25}$ is preferably a nonionic surfactant, wherein x and y are 0, the total of x and y is averagely from 1 to 4, or the total of x and y is averagely from 10 to 30.

A POA chain having a carbon number of at least 3 in the surfactant $c^3$ is preferably polyoxytetramethylene (hereinafter referred to as "POT") and/or a POP chain.

The surfactant $c^3$ is preferably a nonionic surfactant expressed by the following formula $C^{31}$ or $C^{32}$, wherein h is 0 or an integer of from 1 to 200, r is an integer of from 2 to 100, and t is 0 or an integer of from 1 to 200. When h is 0, t is an integer of at least 2, and when t is 0, h is an integer of at least 2. The unit —$C_3H_6O$— may be —$CH(CH_3)$$CH_2$—, —$CH_2CH(CH_3)$— or a mixture of —$CH(CH_3)$$CH_2$— and —$CH_2CH(CH_3)$—. The POA chain is block-like.

HO—$(CH_2CH_2O)_h$—$(C_3H_6O)_r$—$(CH_2CH_2O)_tH$      Formula $C^{31}$

HO—$(CH_2CH_2O)_h$—$(CH_2CH_2CH_2CH_2O)_r$—
    $(CH_2CH_2O)_tH$      Formula $C^{32}$ Examples of the surfactant $c^3$ include the following compounds.

HO—$(CH_2CH_2O)_{15}$—$(C_3H_6O)_{35}$—$(CH_2CH_2O)_{15}H$,
HO—$(CH_2CH_2O)_8$—$(C_3H_6O)_{35}$—$(CH_2CH_2O)_8H$, HO—$(CH_2CH_2O)_{45}$—$(C_3H_6O)_{17}$—$(CH_2CH_2O)_{45}H$, HO—$(CH_2CH_2O)_{34}$—$(CH_2CH_2CH_2CH_2O)_{28}$—$(CH_2CH_2O)_{34}H$.

The surfactant $c^4$ is preferably a nonionic surfactant expressed by the following formula $C^{41}$.

$(R^{17})(R^{18})(R^{19})N(→O)$      Formula $C^{41}$

In the above formula, $R^{17}$, $R^{18}$ and $R^{19}$ are respectively independently a monovalent hydrocarbon group. In the present invention, a surfactant having an amine oxide (N→O) group is handled as a nonionic surfactant. The surfactant $c^4$ may be one kind or a combination of two or more kinds.

In view of dispersion stability of the polymer (A), the surfactant $c^4$ is preferably a nonionic surfactant expressed by the following formula $C^{42}$.

$(R^{20})(CH_3)_2N(→O)$      Formula $C^{42}$

In the above formula, $R^{20}$ is a $C_6$–$C_{22}$ alkyl group, a $C_6$–$C_{22}$ alkenyl group, a phenyl group having an alkyl group (carbon number=6–22) bonded or a phenyl group having an alkenyl group (carbon number=6–22) bonded, and a $C_8$–$C_{22}$ alkyl group or a $C_8$–$C_{22}$ alkenyl group is preferable.

Examples of the nonionic surfactant expressed by the formula $C^{42}$ include the following compounds.

$[H(CH_2)_{12}](CH_3)_2N(→O)$,
$[H(CH_2)_{14}](CH_3)_2N(→O)$,
$[H(CH_2)_{16}](CH_3)_2N(→O)$,
$[H(CH_2)_{18}](CH_3)_2N(→O)$.

A substituted phenyl group in the surfactant $c^5$ is preferably a phenyl group substituted with a monovalent hydrocarbon group, more preferably a phenyl group substituted with an alkyl group, an alkenyl group or a styryl group.

Preferable examples of the surfactant $c^5$ include polyoxyethylene mono(alkylphenyl)ether condensate, polyoxyethylene mono(alkenylphenyl)ether condensate, polyoxyethylene mono(alkylphenyl)ether, polyoxyethylene mono(alkenylphenyl)ether or polyoxyethylene mono[(alkyl)(styryl)phenyl]ether.

Examples of the polyoxyethylene mono(substituted phenyl)ether condensate or the polyoxyethylene mono(substituted phenyl)ether include polyoxyethylene mono(nonylphenyl)ether-formaldehyde condensate, polyoxyethylene mono(nonylphenyl)ether, polyoxyethylene mono(octylphenyl)ether, polyoxyethylene mono(oleylphenyl)ether, polyoxyethylene mono[(nonyl)(styryl)phenyl]ether, polyoxyethylene mono[(oleyl)(styryl)phenyl]ether, and the like.

A polyol in the surfactant $c^6$ is glycerin, sorbitan, sorbit, polyglycerin, polyethylene glycol, polyoxyethylene glyceryl ether, polyoxyethylene sorbitan ether or polyoxyethylene sorbit ether.

Examples of the surfactant $c^6$ include 1:1 (mol ratio) ester of octadecanoic acid and polyethylene glycol, 1:4 (mol ratio) ester of sorbit-polyethylene glycol ether and oleic acid, 1:1 (mol ratio) ester of polyoxyethylene glycol-sorbitan ether and octadecanoic acid, 1:1 (mol ratio) ester of polyethylene glycol-sorbitan ether and oleic acid, 1:1 (mol ratio) ester of dodecanoic acid and sorbitan, 1:1 or 2:1 (mol ratio) ester of oleic acid and decaglycerin, 1:1 or 2:1 (mol ratio) ester of octadecanoic acid and decaglycerin, and the like.

In the present invention, when the surfactant (C) contains a cationic surfactant $c^7$, it is preferable to use a cationic surfactant in a substituted ammonium salt form. The cationic surfactant in a substituted ammonium form is preferably an ammonium salt, in which at least one hydrogen atom bonded to a nitrogen atom is substituted with an alkyl group, an alkenyl group or a POA chain having a hydroxyl group at the terminal, and is more preferably a compound expressed by the following formula $C^{71}$.

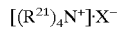   Formula $C^{71}$

In the above formula, $R^{21}$ is a hydrogen atom, a $C_1$–$C_{22}$ alkyl group, a $C_2$–$C_{22}$ alkenyl group or a POA chain having a hydroxyl group at the terminal, and four $R^{21}$ may be the same or different, but at least one of $R^{21}$ is an alkyl group. $X^-$ is a pair ion.

$R^{21}$ is preferably a long chain alkyl group having a carbon number of from 6 to 22 or a long chain alkenyl group having a carbon number of from 6 to 22. When $R^{21}$ is an alkyl group other than a long chain alkyl group, a methyl group or an ethyl group is preferable. When $R^{21}$ is a POA group, a POE group is preferable. $X^-$ is preferably a chlorine ion, an ethylsulfuric acid ion or an acetic acid ion.

Examples of the compound expressed by the formula $C^{71}$ include monooctadecyltrimethylammonium chloride, monooctadecyldimethylmonoethylammonium ethylsulfate, mono(octadecyl)monomethyldi(polyethylene glycol) ammonium chloride, di(tallow oil alkyl)dimethylammonium chloride, dimethylmonococonutamine acetate, and the like.

In the present invention, when the surfactant (C) contains an amphoteric surfactant $c^8$, a preferable amphoteric surfactant is in a form of alanines, imidazorinium betaines, amide-betaines or acetic acid betaines. Examples of the amphoteric surfactant $c^8$ include dodecylbetaine, octadecylbetaine, dodecylcarboxymethylhydroxyethylimidazoriniumbetaine, dodecyldimethylaminoacetic acid betaine, aliphatic acid amidepropyldimethylaminoacetic acid betaine, and the like.

A content of the surfactant (C) is preferably polymer (A)/surfactant (C)=100/1–10, more preferably 100/3–8 at a mass ratio. When the content of the surfactant (C) is too small, stability of emulsion is lowered, and when the content of the surfactant (C) is too large, durability of water- and oil-repellent performance is lowered and dye fastness is damaged.

When a cationic surfactant $c^7$ and/or an amphoteric surfactant $c^8$ are used as the surfactant (C), it is preferable to use nonionic surfactants $c^1$ to $c^6$ in combination therewith. A content of the cationic surfactant and/or the amphoteric surfactant is preferably polymer (A)/cationic surfactant= 100/0.1 to 2 at a mass ratio and polymer (A)/amphoteric surfactant=100/0.1 to 2. If the content of the cationic surfactant and/or the amphoteric surfactant is too large, a combination use effect with a dyeing processing assistant is lowered.

Examples of a method for preparing the polymer (A) of the present invention include a bulk polymerization method, a solution polymerization method, a suspension polymerization method, an emulsion polymerization method and the like, but an emulsion polymerization method is preferable. In the emulsion polymerization method, it is preferable to copolymerize monomer $a^1$, monomer $a^2$, monomer $a^3$ and monomer $a^4$ in the presence of a surfactant (C) in an aqueous medium having a polymerization initiator and a chain transfer agent added thereto.

The polymerization initiator is preferably a water-soluble or oil-soluble polymerization initiator, and a commonly used initiator such as an azo type initiator, a peroxide type initiator or a redox type initiator is used depending on a polymerization temperature. As the polymerization initiator, a water-soluble initiator is preferable, and particularly a water-soluble salt of an azo type compound is more preferable. The polymerization temperature is not specially limited, but is preferably from 20 to 150° C.

The chain transfer agent is preferably an aromatic type compound or mercaptans, and alkylmercaptans are more preferable. Examples of the chain transfer agent include octyl mercaptan, dodecyl mercaptan, tert-dodecyl mercaptan, stearyl mercaptan or α-methylstyrene dimmer $CH_2=CPhCH_2C(CH_3)_2Ph$ (wherein Ph is a phenyl group), and the like.

In the present invention, before starting emulsion polymerization, it is preferable to have a mixture of a monomer, a surfactant and an aqueous medium subjected to mixing and dispersing (which may be referred to as "pre-emulsifying") by a homomixer or a high pressure emulsifier. When a polymerization mixture is previously subjected to mixing and dispersing before starting polymerization, a polymerization yield of a finally obtained polymer (A) is preferably improved.

The polymer (A) is preferably dispersed as particles in an aqueous medium. The polymer (A) dispersed in the aqueous medium has an average particle size of preferably from 10 to 1000 nm, more preferably from 10 to 300 nm, most preferably from 10 to 200 nm. If the average particle size is less than 10 μm, it is necessary to use a large amount of surfactant in order to obtain a stable dispersion, and water- and oil-repellency of the treated material is lowered and crocking of color of dyed clothes is caused. When the average particle size exceeds 1000 nm, dispersed particles are not stable and are settled in the aqueous medium. The average particle size is measured by a dynamic light scattering apparatus, an electron microscope or the like.

The water- and oil-repellent composition of the present invention may contain various additives. These additives are different from the polymer (A), examples of which include a polymer extender, a water-repellent, an oil-repellent, a crosslinking agent, an antistatic agent, a dye stabilizer, an anti-creasing agent, a stein blocker, a flame-retardant, a moth-proofing agent, and the like.

It is preferable that the water- and oil-repellent composition of the present invention does not contain a polymer containing a polymerization unit having an organic halogen atom (except for a fluorine atom) and/or an organic halogen compound (except for an organic fluorine compound).

A solid content of the water- and oil-repellent composition of the present invention is preferably from 10 to 40 mass %, more preferably from 15 to 30 mass %, in view of preservation stability of emulsion, transportation cost or the like.

Examples of a material to be treated by the water- and oil-repellent composition of the present invention include textile fabrics such as single fiber, complex fiber, cloth, carpet or the like, leather products such as fur, paper, wood, plastics, glass, metal, metal oxide, asbestos, brick, cement, and other ceramics, and a particularly preferable example includes textile fabrics.

Examples of textile fabrics include natural fibers such as cotton, hemp, wool, silk or the like, synthetic fibers such as polyamide, polyester, polyvinyl alcohol, polyacrylonitrile, polyvinyl chloride, polypropylene or the like, semi-synthetic fibers such as rayon, acetate or the like, inorganic fibers such as glass fiber, carbon fiber, asbestos fiber or the like, or their mixed fiber fabrics.

The water- and oil-repellent composition of the present invention is diluted to an optional concentration depending on its objects or uses, and is coated on a material to be treated. An optional method can be employed as a coating method applied to a material to be coated, depending on a kind of the material to be treated, a preparation style of the composition or other conditions. For example, when employing a dip-coating method, a material to be treated is dipped in a diluted solution of the water- and oil-repellent composition, and the coated material thus treated is dried. At the time of dipping, it may be preferable to use an appropriate crosslinking agent if necessary, and to carry out a curing treatment at a high temperature.

For example, when treating textile fabrics such as nylon, polyester, cotton or the like for clothes, a non-volatile content concentration is preferably from 0.1 to 3 mass %, more preferably from 0.5 to 2 mass %, in order to achieve an appropriate water- and oil-repellency while maintaining a satisfactory hand feeling of fabrics and to obtain an economical advantage. Also, in order to form a film of the water- and oil-repellent composition on the surface of fibers and to be fully adhered thereto, it is preferable to carry out a heat treatment including drying and curing at 80 to 200° C. for 30 to 300 seconds.

The water- and oil-repellent composition of the present invention can impart water- and oil-repellency excellent in durability to a material to be treated, and does not make the treated material yellowish and does not cause crude hardening of hand feeling of the treated material. Also, as compared with a conventional method, a processing method is convenient, and a processing bath is excellent in stability, easy handling and economical viewpoint.

EXAMPLES

The present invention is further illustrated with reference to the following Polymerization Examples and Working Examples, but should not be limited thereto. Examples 1 to 5 are Examples of the present invention and Examples 6 to 17 are Comparative Examples. Also, preparation of a treating solution for processing, preparation of a cloth for evaluating water- and oil-repellency, evaluation of stability of a processing bath, evaluation of water-repellency, evaluation of oil-repellency, evaluation of washing resistance, evaluation of yellow coloring and evaluation of hand feeling were made by the following methods.

(Preparation of Treating Solution for Processing)

A treating solution for processing was prepared by adjusting a water- and oil-repellent composition with tap water in such a manner as to make a non-volatile content concentration 1 mass %. As Comparative Examples, two treating solutions were prepared in the same manner as above by using a commercially available fluorine type water- and oil-repellent, a methylol melamine type resin (crosslinking agent) and its catalyst, and by using a commercially available fluorine type water- and oil-repellent and a commercially available blocked isocyanate type crosslinking agent (resin).

(Preparation of Cloth for Evaluating Water- and Oil-repellency)

An undyed mercerized cotton (100%) broadcloth was dipped in a treating solution, and the wet cloth thus dipped was subjected to squeezing between two rubber rollers in such a manner as to make a wet pickup 70 mass %. The cloth thus treated was dried at 110° C. for 60 seconds, and was then heat-treated at 170° C. for 90 seconds to prepare a test cloth. Also, when employing a dyed nylon Taslan cloth treated with a fixing agent, a test cloth was prepared in the same manner as in the above cotton (100%) broadcloth, except that a wet pickup was made 60 mass %.

(Evaluation of Stability of Processing Bath)

A test solution for evaluation was prepared in the same manner as in the above processing solution. 100 mL of each test solution for evaluation was placed in a glass-made sample bottle, and was allowed to stand in a constant temperature tester at 40° C., and after 24 hours, a state of the test solution was visually valuated.

(Evaluation of Water-repellency)

Spraying test of JIS-L1092 1992 was carried out, and results were shown by water repellency numbers as illustrated in the following Table 1. Intermediate evaluation results between water repellency numbers were evaluated by attaching marks + and −, and + means a better result and − means a worse result.

TABLE 1

| Water-repellency No. | State |
|---|---|
| 100 | No wet surface |
| 90 | Slightly wet surface |
| 80 | Partly wet surface |
| 70 | Wet surface |
| 50 | Whole wet surface |
| 0 | Completely wet surface on both front and back sides |

(Evaluation of Oil-repellency)

Oil-repellency test was carried out in accordance with AATCC-Test Method 118-1997, and results were shown by oil-repellency numbers as illustrated in the following Table 2.

TABLE 2

| Oil-repellency No. | Test solution | Surface tension mN/m (25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradiecane | 26.7 |
| 3 | n-hexadecane | 27.3 |
| 2 | Nujol 65 parts/ hexadecane 35 parts | 29.6 |
| 1 | Nujol | 31.2 |
| 0 | Less than 1 | — |

(Evaluation of Washing Resistance)

In accordance with JIS L1091:1998 5.2a)3) C method, a cotton broadcloth was washed in such a manner as to correspond to five times of domestic washing and a nylon Taslan cloth was washed in such a manner as to correspond to ten times of domestic washing (respectively referred to as "HL-5" and "HL-10"). The washing was carried out by using an all automatic repeating type washing tester AWS-30 manufactured by Daiei Kagaku Seiki K.K. and a washing detergent of "Attack" manufactured by Kao K.K. After washing, the washed cloth was dried in air and heat-dried by a pin stenter for testing. The drying in air was carried out at a temperature of 25° C. and at a moisture of 60% RH for one night. The heat-drying was carried out at 75° C. for 5 minutes. Water-repellency and oil-repellency were evaluated before and after washing. With regard to the washed clothes, water-repellency and oil-repellency were evaluated after drying in air and after heat-drying (drying at 75° C. for 5 minutes).

(Evaluation of Yellowing)

An undyed mercerized cotton (100%) broadcloth was treated in the same manner as in the cloth used for evaluating water-repellency and oil-repellency, and color change of the cloth was visually evaluated.

(Evaluation of Hand Feeling)

An undyed mercerized cotton (100%) broadcloth and a dyed nylon taffeta cloth treated with a fixing agent were treated in the same manner as in the cloth used for evaluating water-repellency and oil-repellency, and hand feeling of the cloth was evaluated by a functional test, and the results were evaluated by five ranks as shown in the following Table 3.

TABLE 3

| Evaluation | Hand feeling |
|---|---|
| 5 | Softer hand feeling than untreated cloth |
| 4 | Somewhat softer hand feeling than untreated cloth |
| 3 | Same as untreated cloth |
| 2 | Somewhat harder hand feeling than untreated cloth |
| 1 | Harder hand feeling than untreated cloth |

Polymerization Example 158.7 g of perfluoroalkylethyl acrylate ($F(CF_2)_nCH_2CH_2OCOCH=CH_2$, mixture of n=6–16, average value of n=9, purity 93.6 mass %, hereinafter referred to as "FA"), 97.2 g of butyl methacrylate, 13.5 g of stearyl acrylate, 10.8 g of 2-isocyanate ethyl methacrylate, the isocyanate group of which is blocked with 2-butanone oxime, 0.8 g of dodecyl mercaptan (DoSH), 10.8 g of polyoxyethyleneoleyl ether (average addition mol number of ethylene oxide=30) (Nonion E230 manufactured by NOF Corporation), 1.4 g of polyoxyethylene-polyoxypropylene block copolymer (Pronon 204 manufactured by NOF Corporation), 1.4 g of 4,7-bispolyoxyethyleneoxy-2,4,7,9-tetramethyl-5-decyne (Surfynol 485 manufactured by Air Products and Chemical Inc.), 4.3 g of stearyl trimethylammonium chloride (purity=63%), 108 g of dipropylene glycol, 389.9 g of ion exchanged water and 1.9 g of acetic acid were placed in a 1 L glass-made beaker.

The beaker was heated at 50° C. in a hot water bath, and the content was mixed by a homomixer (TK homomixer MK2 manufactured by Tokushu Kika K.K.) to obtain a mixed solution. The mixed solution was emulsified under a pressure of 40 MPa by a high pressure emulsifying machine (LAB60-10TBS manufactured by APV Gholin K.K.) while maintaining at 50° C.

698.8 g of the emulsified solution thus obtained was placed in a 1 L autoclave, and was cooled to at most 30° C. 1.2 g of 2,2'-azobis[2-(2-imidazolin-2-yl)propane] (VA-061 manufactured by Wako Pure Chemical Industries, Ltd.) was added thereto, and air phase was substituted with nitrogen. The resultant mixture was polymerized for 8 hours by heating to 60° C. while stirring, thus obtaining a milk white emulsion.

The emulsion thus obtained was filtrated under pressure by a filter paper (C-63 manufactured by Advantec Co., Ltd.). The emulsion filtrated under pressure was dried at 120° C. for 4 hours, and a non-volatile content concentration (hereinafter referred to as "solid content concentration") was 35.0 mass % and an average particle size of dispersion particles measured by a dynamic light scattering particle size-measuring apparatus (ELS-800 manufactured by Otsuka Electronics Co., Ltd.) was 125 nm. The emulsion was adjusted by ion exchanged water so as to provide a concentration of 20%, thus obtaining a water- and oil-repellent composition.

Polymerization Examples 2 to 9

By using starting material compositions as shown in the following Table 4 or 5, water- and oil-repellent compositions 2 to 9 were obtained in the same manner as in the above Polymerization Example 1. Abbreviations of starting materials are illustrated below.

FA: The above perfluoroalkylethyl acrylate,

BMA: Butyl methacrylate,

StA: Stearyl acrylate,

VMA-70: Mixture of stearyl methacrylate and behenyl methacrylate (Blenmer VMA-70 manufactured by NOF Corporation), MOI-BM: 2-Isocyanate ethyl methacrylate, the isocyanate group of which is blocked with 2-butanone oxime (compound of the following formula 3),

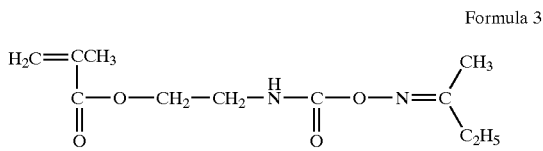

Formula 3

MOI-PY: 2-Isocyanate ethyl methacrylate, the isocyanate group of which is blocked with 3,5-dimethylpyrazole (compound of the following formula 4),

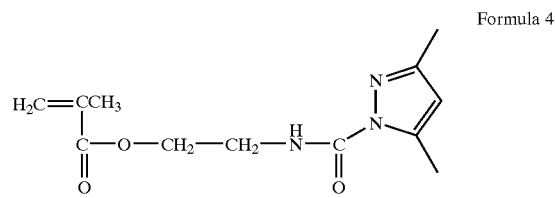

Formula 4

VI-VM: 1,3,3-Trimethyl-4-isocyanatecyclohexylmethylamidoxyethyl methacrylate, the isocyanate group of which is blocked with 2-butanone oxime (compound of the following formula 5),

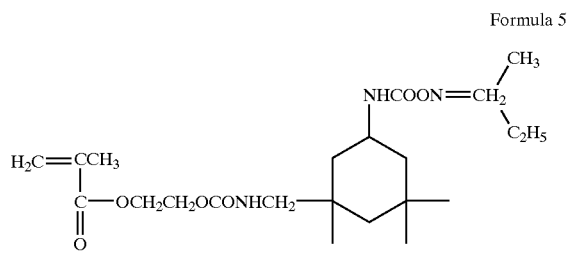

Formula 5

BMAA: N-butoxymethylacrylamide,

P204: Polyoxyethylene-polyoxypropylene block copolymer (Pronon 204 manufactured by NOF Corporation), E230: Polyoxyethylene oleyl ether (average addition mol number of ethylene oxide=30) (Nonion E230 manufactured by NOF Corporation), S485: 4,7-Bispolyoxyethylene-2,4,7,9-tetramethyl-5-decyne (Surfynol 485 manufactured by Air Products and Chemical Inc.), STMAC: Stearyltrimethylammonium chloride, SLS: Sodium laurylsulfate, DPG: Dipropylene glycol, DoSH: Normal-dodecyl mercaptan, VA-061: 2,2'-azobis[2-(2-imidazolin-2-yl)propane] (manufactured by Wako Pure Chemical Industries, Ltd.), and V-501: 4,4'-Azobis(4-cyanovaleric acid) (manufactured by Wako Pure Chemical Industries, Ltd.).

TABLE 4

| Starting material | Polymerization Example 1 | Polymerization Example 2 | Polymerization Example 3 | Polymerization Example 4 | Polymerization Example 5 |
|---|---|---|---|---|---|
| FA | 158.7 | 158.7 | 158.7 | 158.7 | 158.7 |
| BMA | 97.2 | 91.8 | 91.8 | 91.8 | 91.8 |
| StA | 13.5 | 13.5 | 13.5 | — | — |
| VMA-70 | — | — | — | — | 13.5 |
| GMA | — | 5.4 | 5.4 | 5.4 | 5.4 |
| MOI-BM | 10.8 | 10.8 | — | — | — |
| MOI-py | — | — | 10.8 | — | — |
| VI-BM | — | — | — | 10.8 | — |
| BMAA | — | — | — | — | — |
| P204 | 1.4 | 1.4 | 1.4 | 1.4 | 1.4 |
| E230 | 10.8 | 10.8 | 10.8 | 10.8 | 10.8 |
| S485 | 1.4 | 1.4 | 1.4 | 1.4 | 1.4 |
| STMAC | 4.3 | 4.3 | 4.3 | 4.3 | 4.3 |
| SLS | — | — | — | — | — |
| Na$_2$CO$_3$ | — | — | — | — | — |
| Acetic acid | 1.9 | 1.9 | 1.9 | 1.9 | 1.9 |
| DPG | 108 | 108 | 108 | 108 | 108 |
| Water | 389.9 | 389.9 | 389.9 | 389.9 | 389.9 |
| D$_O$SH | 0.8 | 0.8 | 0.8 | 0.8 | 0.8 |
| VA-061 | 1.2 | 1.2 | 1.2 | 1.2 | 1.2 |
| V-501 | — | — | — | — | — |
| Particle size (μm) | 125 | 132 | 140 | 115 | 151 |

TABLE 5

| Starting material | Polymerization Example 6 | Polymerization Example 7 | Polymerization Example 8 | Polymerization Example 9 |
|---|---|---|---|---|
| FA | 158.7 | 158.7 | 158.7 | 159.0 |
| BMA | 105.3 | — | 91.8 | 91.9 |
| StA | — | 105.3 | 13.5 | 13.5 |
| VMA-70 | — | — | — | — |
| GMA | 5.4 | 5.4 | 5.4 | 5.4 |
| MOI-BM | 10.8 | 10.8 | — | 10.8 |
| MOI-py | — | — | — | — |
| VI-BM | — | — | — | — |
| BMAA | — | — | 10.8 | — |
| P204 | 1.4 | 1.4 | 1.4 | 1.4 |
| E230 | 10.8 | 10.8 | 10.8 | 10.8 |
| S485 | 1.4 | 1.4 | 1.4 | 1.4 |
| STMAC | 4.3 | 4.3 | 4.3 | — |
| SLS | — | — | — | 2.7 |
| Na$_2$CO$_3$ | — | — | — | 0.7 |
| Acetic acid | 1.9 | 1.9 | 1.9 | 1.9 |
| DPG | 108 | 108 | 108 | 108 |
| Water | 389.9 | 389.9 | 389.9 | 392.1 |
| DOSH | 0.8 | 0.8 | 0.8 | 0.8 |
| VA-061 | 1.2 | 1.2 | 1.2 | — |
| V-501 | — | — | — | 1.2 |
| Particle size (μm) | 125 | 263 | 180 | 204 |

Example 1

The water- and oil-repellent composition obtained in the above Polymerization Example 1 was evaluated with respect to processability, stability in a processing bath, water-repellency, oil-repellency, washing resistance, yellowing and hand feeling in accordance with such prescriptions as shown in the following Table 6. The results are shown in the following Tables 7 to 9.

Examples 2 to 17

The water- and oil-repellent compositions as shown in the following Table 6 were evaluated with respect to processability, stability in a processing bath, water-repellency, oil-repellency, washing resistance, yellowing and hand feeling in accordance with such prescriptions as shown in Table 6. The results are shown in the following Tables 7 to 9. Commercially available water- and oil-repellents used in Comparative Examples are illustrated below.

AG-480: Fluorine type water- and oil-repellent (containing organic chlorine) having a solid content concentration of 20%, Asahiguard AG-480 manufactured by Asahi Glass Company, Limited, TG-561: Fluorine type water- and oil-repellent (containing organic chlorine) having a solid content concentration of 30%, Unidyne TG-561 manufactured by Daikin Industries, Ltd., M-3: Trimethylolmelamine type crosslinking agent, Sumitex Resin M-3 manufactured by Sumitomo Chemical Co., Ltd., Catalyst: Organic amine type catalyst for melamine resin, Sumitex accelerator manufactured by Sumitomo Chemical Co., Ltd., and PB-11: Commercially available blocked isocyanate crosslinking agent, Meikanate PB-11 manufactured by Meisei Kagaku Kogyo K.K.

TABLE 6

| Water- and oil-repellent composition | | M-3/Catalyst | BP-11 |
|---|---|---|---|
| Kind | Concentration | Concentration | Concentration |
| Ex. 1 | Polymerization Ex. 1 | 1% | — | — |
| Ex. 2 | Polymerization Ex. 2 | 1% | — | — |
| Ex. 3 | Polymerization Ex. 3 | 1% | — | — |
| Ex. 4 | Polymerization Ex. 4 | 1% | — | — |
| Ex. 5 | Polymerization Ex. 5 | 1% | — | — |
| Ex. 6 | Polymerization Ex. 6 | 1% | — | — |
| Ex. 7 | Polymerization Ex. 7 | 1% | — | — |
| Ex. 8 | Polymerization Ex. 8 | 1% | — | — |
| Ex. 9 | Polymerization Ex. 9 | 1% | — | — |
| Ex. 10 | Polymerization Ex. 8 | 1% | 0.3%/0.3% | — |

TABLE 6-continued

| Water- and oil-repellent composition | | Catalyst | M-3/ BP-11 |
|---|---|---|---|
| Kind | Concentration | Concentration | Concentration |
| Ex. 11 Polymerization Ex. 8 | 1% | — | 2% |
| Ex. 12 AG-480 | 1% | — | — |
| Ex. 13 AG-480 | 1% | 0.3%/0.3% | — |
| Ex. 14 AG-480 | 1% | — | 2% |
| Ex. 15 TG-561 | 1% | — | — |
| Ex. 16 TG-561 | 1% | 0.3%/0.3% | — |
| Ex. 17 TG-561 | 1% | — | 2% |

TABLE 7

| | | Water-repellency/oil-repellency, cotton broadcloth | |
|---|---|---|---|
| Water- and oil-repellent composition | Initial stage | HL-5 after drying in air | HL-5 after drying at 75° C. |
| Ex. 1 Polymerization Ex. 1 | 100/5 | 70⁺/2 | 80/2 |
| Ex. 2 Polymerization Ex. 2 | 100/5 | 80⁻/2 | 80⁺/3 |
| Ex. 3 Polymerization Ex. 3 | 100/5 | 70⁺/2 | 80⁺/2 |
| Ex. 4 Polymerization Ex. 4 | 100/5 | 70/1 | 80⁻/2 |
| Ex. 5 Polymerization Ex. 5 | 100/4 | 70⁺/2 | 80/2 |
| Ex. 6 Polymerization Ex. 6 | 100⁻/4 | 70⁻/1 | 70⁺/1 |
| Ex. 7 Polymerization Ex. 7 | 100⁻/4 | 70⁻/0 | 70/1 |
| Ex. 8 Polymerization Ex. 8 | 100⁻/4 | 50/1 | 70⁻/1 |
| Ex. 9 Polymerization Ex. 9 | 70/2 | 50/0 | 70⁻/1 |
| Ex. 11 Polymerization Ex. 8 | 100/4 | 70⁺/2 | 80/2 |
| Ex. 12 AG-480 | 100/4 | 50/0 | 50⁺/0 |
| Ex. 14 AG-480 | 100/4 | 80⁻/2 | 90/2 |
| Ex. 15 TG-561 | 100/5 | 50/1 | 50⁺/1 |
| Ex. 17 TG-561 | 100⁻/5 | 70/2 | 80/2 |

TABLE 8

| | | Water-repellency/oil-repellency, cotton broadcloth | |
|---|---|---|---|
| Water- and oil-repellent composition | Initial stage | HL-10 after drying in air | HL-5 after drying at 75° C. |
| Ex. 1 Polymerization Ex. 1 | 100/5 | 70/3 | 100⁻/4 |
| Ex. 2 Polymerization Ex. 2 | 100/5 | 70/3 | 100⁻/4 |
| Ex. 3 Polymerization Ex. 3 | 100/5 | 70/3 | 100⁻/4 |
| Ex. 4 Polymerization Ex. 4 | 100/5 | 70/2 | 80⁺/3 |
| Ex. 5 Polymerization Ex. 5 | 100/4 | 70/2 | 90/4 |
| Ex. 6 Polymerization Ex. 6 | 100/4 | 70⁻/3 | 80⁺/3 |
| Ex. 7 Polymerization Ex. 7 | 100/4 | 70⁻/1 | 80/2 |
| Ex. 8 Polymerization Ex. 8 | 100/5 | 50/0 | 50⁺/0 |
| Ex. 9 Polymerization Ex. 9 | 80/2 | 0/0 | 50/0 |
| Ex. 10 Polymerization Ex. 8 | 100/5 | 80/2 | 90/3 |
| Ex. 11 Polymerization Ex. 8 | 100/5 | 70/1 | 80⁺/3 |
| Ex. 12 AG-480 | 100/4 | 50/0 | 50/1 |
| Ex. 13 AG-480 | 100/5 | 80/3 | 100⁻/3 |
| Ex. 14 AG-480 | 100/4 | 70/2 | 80⁺/3 |
| Ex. 15 TG-561 | 100/5 | 50/0 | 50⁺/0 |
| Ex. 16 TG-561 | 100/5 | 90/3 | 100⁻/4 |
| Ex. 17 TG-561 | 100/5 | 70/3 | 90⁻/4 |

TABLE 9

| Water- and oil-repellent composition | | Presence or absence of yellowing | Hand feeling | Stability in a processing bath |
|---|---|---|---|---|
| Ex. 1 | Polymerization Ex. 1 | Absent | 4 | No change |
| Ex. 2 | Polymerization Ex. 2 | Absent | 3 | No change |
| Ex. 3 | Polymerization Ex. 3 | Absent | 3 | No change |
| Ex. 4 | Polymerization Ex. 4 | Absent | 3 | No change |
| Ex. 5 | Polymerization Ex. 5 | Absent | 3 | No change |
| Ex. 6 | Polymerization Ex. 6 | Absent | 3 | No change |
| Ex. 7 | Polymerization Ex. 7 | Absent | 2 | No change |
| Ex. 8 | Polymerization Ex. 8 | Absent | 3 | No change |
| Ex. 9 | Polymerization Ex. 9 | Absent | 3 | Cloudy |
| Ex. 10 | Polymerization Ex. 8 | Absent | 2 | Cloudy |
| Ex. 11 | Polymerization Ex. 8 | Present | 2 | Partly settling |
| Ex. 12 | AG-480 | Absent | 4 | No change |
| Ex. 13 | AG-480 | Absent | 2 | Cloudy |
| Ex. 14 | AG-480 | Present | 2 | Partly settling |
| Ex. 15 | TG-561 | Absent | 2 | No change |
| Ex. 16 | TG-561 | Slightly present | 1 | Partly settling |
| Ex. 17 | TG-561 | Present | 1 | Partly settling |

The entire disclosure of Japanese Patent Application No. 2001-127977 filed on Apr. 25, 2001 including specification, claims and summary is incorporated herein by reference in its entirety.

What is claimed is:

1. A water- and oil-repellent composition which comprises (A) the following polymer, (B) an aqueous medium and (C) a surfactant in a mass ratio of (A)/(B)/(C)=100/100–500/1–10:

Polymer (A): a copolymer containing (1) a monomer unit based on a (meth)acrylate having a polyfluoroalkyl group, (2) a monomer unit based on an alkyl(meth)acrylate having a $C_{16}$–$C_{12}$ alkyl group, (3) a monomer unit based on an alkyl(meth)acrylate having a $C_1$–$C_{22}$ alkyl group, and (4) a monomer unit based on at least one compound selected from the group consisting of 2-isocyanate ethyl methacrylate, 1,3,3-trimethyl-4-isocyanate cyclohexylmethylamidoxyethyl methacrylate of Formula 1 and 1,3,3-trimethyl-4-isocyanate cyclohexylmethylamidoxyethyl acrylate of Formula 2, the isocyanate group of which is blocked:

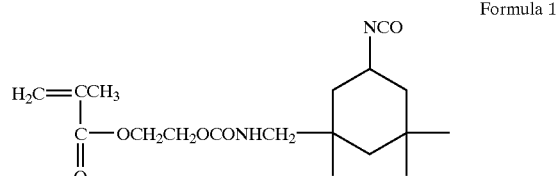

Formula 1

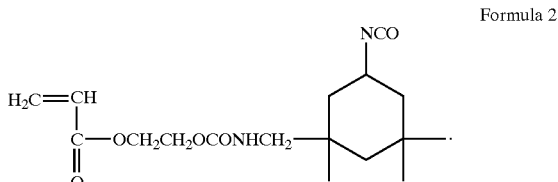

Formula 2

2. The water- and oil-repellent composition according to claim 1, wherein the water- and oil-repellent composition does not contain a polymer containing a monomer unit having an organic halogen atom, except for a fluorine atom, and/or an organic halogen compound, except for an organic fluorine compound.

3. The water- and oil-repellent composition according to claim 1, wherein the aqueous medium (B) is water or a mixed solvent of water and at least one solvent selected from the group consisting of propylene glycol, dipropylene glycol and tripropylene glycol.

4. The water- and oil-repellent composition according to claim 1, wherein the surfactant (C) is a combination of a nonionic surfactant and a cationic surfactant.

5. The water- and oil-repellent composition according to claim 4, wherein the nonionic surfactant is surfactant $c^1$,
wherein surfactant $c^1$: polyoxyalkylene monoalkyl ether, polyoxyalkylene monoalkenyl ether or polyoxyalkylene monoalkapolyenyl ether.

6. The water- and oil-repellent composition according to claim 4, wherein the nonionic surfactant contains at least one surfactant selected from the group consisting of surfactant $c^1$, surfactant $c^2$, and surfactant $c^3$,
wherein:
surfactant $c^1$: polyoxyalkylene monoalkyl ether, polyoxyalkylene monoalkenyl ether or polyoxyalkylene monoalkapolyenyl ether;
surfactant $c^2$: a nonionic surfactant comprising a compound having at least one carbon-carbon triple bond and at least one hydroxyl group in a molecule, and
surfactant $c^3$: a nonionic surfactant comprising a compound having a connection of a polyoxyethylene chain having at least two oxyethylene chains continuously connected and a chain having at least two oxyalkylene chains of at least 3 carbon atoms continuously connected, and having hydroxyl groups on both terminals.

7. The water- and oil-repellent composition according to claim 4, wherein the cationic surfactant is a compound expressed by Formula $C^{71}$.

$$[(R^{21})_4N^+]\cdot X^- \qquad \text{Formula } C^{71}$$

wherein $R^{21}$ is a hydrogen atom, a $C_1$–$C_{22}$ alkyl group, a $C_2$–$C_{22}$ alkenyl group or a polyoxyalkylene chain having a hydroxyl group at the terminal, and four $R^{21}$ may be the same or different, but at least one of $R^{21}$ is an alkyl group, and $X^-$ is a pair ion.

8. The water- and oil-repellent composition according to claim 1, wherein the (meth)acrylate having a polyfluoroalkyl group (1) in the polymer (A) is a compound expressed by $R^f$—Q—OCOCR=CH$_2$,
wherein $R^f$ is a $C_2$–$C_{20}$ polyfluoroalkyl group, R is a hydrogen atom or a methyl group, and Q is a divalent organic group.

9. The water- and oil-repellent composition according to claim 1, wherein the compound used for blocking the isocyanate group of (4) in the polymer (A) is 2-butanone oxime, 3-methylpyrazole or 3,5-dimethylpyrazole.

10. The water- and oil-repellent composition according to claim 1, wherein the polymer (A) is prepared by an emulsion polymerization method.

* * * * *